United States Patent

Baker et al.

[15] 3,698,149
[45] Oct. 17, 1972

[54] COMPOSITE BEAM STRUCTURE AND ASSEMBLY

[72] Inventors: William Baker, 403 Loudonville Road, Albany, N.Y.; Clyde Worrell, 334 Southwest 12th Avenue, Boynton; Donald Howard Banzhaf, 5805 Orchard Way, Palm Beach, both of Fla.

[22] Filed: Sept. 15, 1969

[21] Appl. No.: 9,252

[52] U.S. Cl. ..................52/731, 52/729, 61/61, 52/627, 52/90, 52/593
[51] Int. Cl. ..................E04c 2/40, E04c 3/04
[58] Field of Search..................61/61, 62, 58–60; 52/730–732, 242, 716–718, 729, 629, 627, 628

[56] References Cited

UNITED STATES PATENTS

| | | | |
|---|---|---|---|
| 835,863 | 11/1906 | Otte | 52/456 |
| 1,207,080 | 12/1916 | Ruth | 52/730 |
| 1,426,277 | 8/1922 | Conant | 52/717 |
| 1,608,672 | 11/1926 | Rappaport | 52/731 |
| 2,478,993 | 8/1949 | Wing | 52/579 |

FOREIGN PATENTS OR APPLICATIONS

| | | | |
|---|---|---|---|
| 782,900 | 6/1954 | Great Britain | 52/90 |
| 264,468 | 1/1928 | Great Britain | 61/62 |
| 47,434 | 1/1937 | France | 61/61 |

*Primary Examiner*—Frank L. Abbott
*Assistant Examiner*—James L. Ridgill, Jr.
*Attorney*—Janes & Chapman This application filed under Rule 47a.

[57] ABSTRACT

A composite beam structure is provided for the construction of walls, roofs, partitions, and other structural supporting assemblies. The beam structure utilizes side-to-side modular double-walled beams, interlocking along two edges on each side, and attached together.

A high strength, lightweight composite structure is provided requiring no additional structural support members to secure each beam to an adjacent beam or to support the composite structure. The composite beam structure can be disassembled without destroying the beams and later reassembled at another location.

26 Claims, 3 Drawing Figures

PATENTED OCT 17 1972
3,698,149
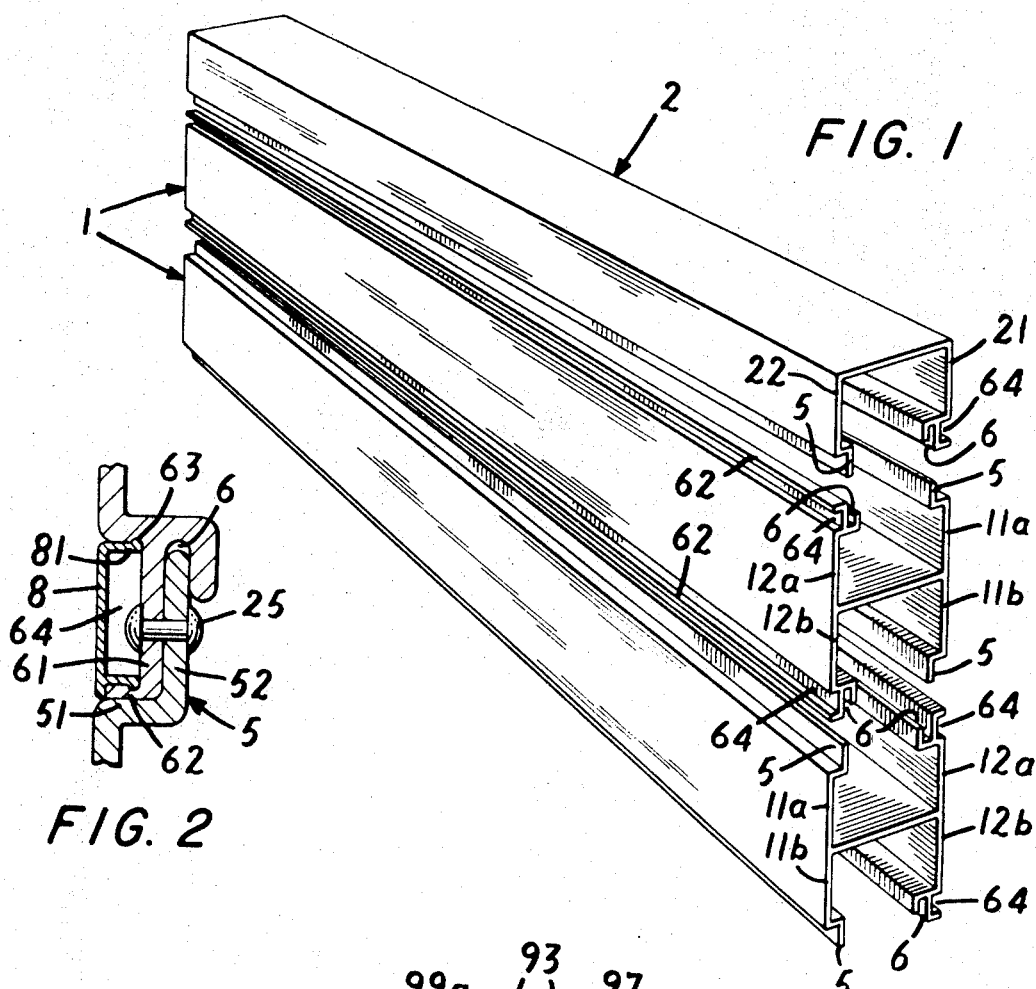
FIG. 1
FIG. 2
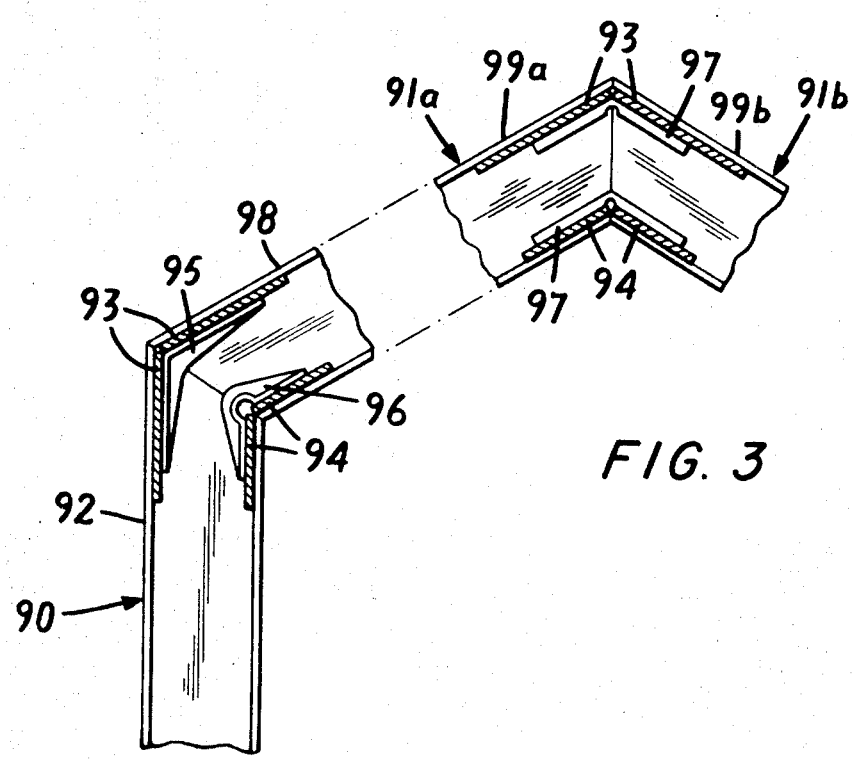
FIG. 3

3,698,149

COMPOSITE BEAM STRUCTURE AND ASSEMBLY

In accordance with the present invention individual double walled modular beam units of any desired shape and length having interlocking connecting means for tightly and rigidly locating and securing adjacent beam units together in a uniform coordinated structure are provided, requiring securing means such as rivets or bolts only to prevent detachment, and to completely rigidify the structure under the stress of the weight of a building, and to resist weather conditions. These can be assembled side-to-side, to form a high strength, lightweight, stable composite beam structure. The tightness of the assembly without securing means helps prevent the shearing of nuts and bolts, and rivets under severe weather stresses. The composite beam assembly of this invention requires no independent structural or base supporting members, can be attached in a manner to permit disassembly without destroying the beam units of which it is composed, and has means for securing and supporting heavy accessory equipment.

Preferred embodiments of the interlocking composite beam structure are shown in the drawings, in which:

FIG. 1 is a break-away perspective view of a plurality of modular beam units assembled to form a composite beam structure of this invention;

FIG. 2 is a cross-sectional detailed view of the interlocking male and female connections of a typical beam of FIG. 1;

FIG. 3 is a partial cross-sectional view of a wall and roof section of a building constructed from the composite beam structure.

The composite beam structure of this invention as shown in FIG. 1 is made up of a series of side-to-side interlockingly modular double walled sections or beam units, comprising inner sections 1 in the form of beams and an outer section 2 in the form of a channel beam. The beam sections 1 have two male flanges 5 running along the edges of the flanges 11a and 11b. The flanges 5 are parallel to the flanges 11a and 11b and extend over the entire length of the beam. Female flange grooves 6 extend along the edges of flanges 12a and 12b at the other end of the beam. The grooves 6 are also parallel to the flanges and extend over the entire length of the beam.

The interlocking connection of the end 5 and the groove 6 is best seen in FIG. 2. The edges of the long sides 61 of the recessed grooves 6 have tabs 62 extending outwardly at right angles. The tabs 62 form outside channels 64 which run parallel to the grooves 6 and have openings which are flush with the outer surface of the flanges 12a and 12b. As shown in FIG. 1, by inverting one beam section with respect to the adjacent beam section, the male flange end 5 of one section will interlock with the female flange groove 6 of the adjacent section, in a tight and rigid fit, and the tab 62 of the long leg 61 of the groove 6 will abut the base portion 51 of the mating end 5.

Similarly, the outer channel beam 2 has an end 5 running along the edge of flange 21 to engage the groove and the lip of the adjacent beam section 1. In this manner, each beam unit is attached to the adjacent beam unit along two edges.

The openings in the grooves 6 are formed slightly smaller than the thickness of the mating end 5, to firmly engage the end, and ensure that adjacent beams are securely held together prior to riveting. In addition, the abutment of the tabs 62 against the base portion 51 of the end provides both a large bearing surface for increased strength and a stop to properly set the spacing between adjacent beams. The legs 61 of the groove 6 and the legs 52 of the flange also abut along their entire length, thereby preventing the angular sideways movement of one beam with respect to an adjacent beam. The beams are tightly secured in their interlocking position by rivets 25 which fasten through the abutting legs 61 and 52.

The inside corners of the channels 64 formed by the tabs 62 are provided with shallow grooves 63, which run along the entire length of the beams. Inserts 8 having corresponding lips 81 can be installed therein and held securely so that accessory equipment or additional structural members might be attached to either side of the composite beam structure. The inserts can be simply snapped into the grooves 63 in a press fit, or slidably installed from the ends of the structure.

The building shown in FIG. 3 has walls 90 and roofing sections 91a and 91b constructed from the composite beam structure of this invention. The uppermost wall beam 92 has a mitered edge which abuts the mitered edge of roofing beam 98. Reinforcement bars 93 and 94 are installed within the beams to provide a mounting base for tension casting 95 and compression casting 96, respectively. Both the tension casting 95 and the compression casting 96 are riveted to the beams 92 and 98 through the reinforcing bars 93 and 94, thus providing a rigid connection between the roof 91b and wall 90. Similarly, the uppermost beams 99a and 99b of the roofing sections 91a and 91b, respectively, both terminate in a mitered abutment at the peak of the roof. Ridge castings 97 are riveted to the roofing beams 99a and 99b through reinforcement bars 93 and 94 to secure the two portions of the roof together. It can be seen from this illustration that similar connecting means can be used to secure adjacent building sections of the composite beam structure having any angle therebetween.

As is apparent from the drawings,

The modular beam unit is provided with two types of mating end shapes. One type is referred to herein as the male flange because the side wall of the beam terminates in a recessed single flange having two portions, a first portion turning inwardly towards the interior of the beam substantially at right angles to the side wall, and a second portion extending substantially parallel to the side wall and substantially at right angles to the inwardly turned first portion. The other type is referred to herein as the female flange, because the side wall of the beam terminates in a recessed double flange having two legs and three portions, a first portion turning inwardly towards the interior of the beam substantially at right angles to the side wall, a first leg constituting the second flange portion extending substantially parallel to the side wall and substantially at right angles to the inwardly turned first portion, and a second leg constituting the third flange portion extending substantially parallel to the side wall substantially at right angles to the inwardly turned portion, and substantially parallel to the first leg, the first and second legs defining a socket substantially parallel to the side wall for reception of the male flange and into which the single male flange of an adjacent beam fits snugly and rigidly. These members can mate in a press fit, if desired, for greater rigidity, but this is not essential, since the adjacent beam units can be attached together by any conventional securing means. In the composite beam assembly, the single male flange and one of the walls of the double female flange of adjacent beam units abut throughout their length to form a continuous connection, which is firmly secured to prevent separation under the stresses experienced in structural assemblies by means of rivets or bolts. Externally of the composite the female shaped flange also defines with the outer side of the beam units a channel into which other structural elements can be fitted. The abutting double female flange wall is preferably formed with an end turned to match the recess of the single flange wall, for better rigidity in interlocking.

Preferably, two side walls of each beam section having mating ends of the male type, and two side walls have mating ends of the female type. Likewise, the channel beam section has an male type mating end, on one side, while the other side has a female type mating end. The two mating ends on each side of the beam sections are preferably of the same type, either male or female.

The long legs of the recessed male flanges are parallel to the sides of the beam units, and extend over the entire length of the beam unit. Similarly, the corresponding recessed female type ends are also parallel to the sides of the beam, and extend over the entire length of the beam. The curved base portion of the female end is designed to mate with the edge of the male end. The openings in the grooves are formed slightly smaller than the thickness of the mating flange so that the grooves will secure the flange in a relatively tight and rigid connection. This allows the assembly of several interlocking beams of the composite and holds them against separation and structural collapse prior to and after bolting or riveting. In addition, to provide further strength, the end of the long leg of each female groove, which is the outermost edge of the flange, is formed into a tab extending outwardly at right angles. When a beam is assembled to an adjacent beam, the male ends will engage and interlock the female grooves, and be securely held thereby, and the tabs will abut the base portion of the male ends to properly control the extend of interlocking. This ensures uniform strength of each interlocking connection. It also ensures constant spacing between each beam, thereby allowing accurate layout and predrilling of rivet and bolt holes in advance, without the need for measurement upon the installation of each beam. The abutment of the tabs and the base portion of the male ends provides a relatively large bearing surface between adjacent beams, which results in the increased strength and rigidity of the composite beam structure. Furthermore, the abutment of the flange walls themselves along the entire length of two edges of each mating beam substantially prevents angular movement of one beam with respect to an adjacent beam, thus reducing the bending stresses that might be placed upon a rivet or bolt. Since compressive loads are supported primarily by the abutment of the mating interlocking connections, the shear stress placed upon the rivets or bolts and the bearing stress placed upon beams at the location of the rivet or bolt holes are extremely low. Therefore, relatively few rivets or bolts are required to firmly and sufficiently, secure adjacent beams. These factors facilitate rapid assembly of a composite beam structure and reduce the cost of construction.

The tabs at the ends of the female grooves also complete the formation of channels which run perpendicularly to the female grooves and have openings flush with the outer surface of the flanges. The inside corners of the channels can be provided with shallow grooves which run along the entire length of the beam. Inserts having corresponding lips can be installed therein, and held securely, so that other structural members or accessory equipment can be mounted to either side of the composite beam structure. The inserts can be made to snap into the grooves of the channels, or merely slide in from one end of a beam. In either case, accessory or structural members attached to the inserts or themselves formed to engage the channels may be assembled to and disassembled from the composite beam structure without the need for extensive tooling, and without the danger of damaging either the beam structure or the accessory equipment. Since every female groove has a channel, and each channel extends over the entire length of the beam unit, it is possible to easily mount additional members in any convenient location on either side of the composite beam structure.

Because the beam units are held together in a tight and rigid fit, the double walled composite beam structure can be assembled quite easily, and supplemental fasteners such as rivets or bolts are needed only to hold the interlocking beams securely together. The interlocking male ends and female grooves, which secure each beam to an adjacent beam along two edges, provide excellent strength and rigidity in use in many construction applications. The beams are particularly useful in dismantlable wall and divider structures, which can be taken apart and stored in a small space.

The length of the sides of the beam members and their spacing by the crosspiece of the beams are determined by, and themselves determine, the size of and the number of units needed to form a composite beam assembly. For optimum strength and rigidity, the side walls and the crosspieces are relatively short, and are of approximately the same length (measuring the length of each of the four side walls from the crosspiece). Depending upon the strength of the material used, they can however, differ in length by ratio of as much as 10 to 1, without becoming unduly weak. Furthermore, if the sides are unusually long, relative to a crosspiece, several crosspieces can be used. However, the shorter the sides, the more versatile are the beam units in forming composite structures of varying size.

The composite beam structure can be assembled so that the beams run either horizontally or vertically. It is therefore, possible to design a structure having a minimum number of joints. For example, a horizontal arrangement for a long relatively low wall would result in far fewer connections, and a correspondingly lower labor cost than a vertical arrangement. In other words, the composite beam structure of this invention possesses sufficient strength and versatility to be utilized in the most efficient and economical manner suitable for the particular construction. It is important to note that the economics of construction are greatly enhanced by the fact that, except for the length, all beam sections are exactly alike. Similarly, all channel or U-beam sections are exactly alike. Each beam unit has two male and two female interlocking connections, and thus each can be fitted to an adjacent unit, regardless of which side the female or male fittings are on. Mass production manufacturing and inventory techniques can, therefore, be applied, and the cost of manufacture and storage kept to a minimum. Similarly, the user need not store predetermined numbers of female and male units, as would be the case were each unit to have fittings only of one type.

Each beam can be formed by extruding, rolling, milling, casting or forging the desired material. Structural metals, such as aluminum and steel, are the most desirable, since they have a relatively low cost, are easy to form and most importantly, provide the required strength necessary for construction. Aluminum is the preferred metal, since it provides strength and formability and can be inexpensively rendered corrosion resistant and be decoratively colored by anodizing. Other materials, such as wood, construction glass, ceramics, and plastics such as nylon, polystyrene, polypropylene, polycarbonates, and polytetrafluoroethylene can also be utilized. Although these materials may not possess the strength of metallic material, they are readily formed into the desired shapes, and are lightweight, and noncorrodible. Therefore, in certain applications they may be more desirable than metallic materials.

The beams can be fastened together by any conventional securing means. These include nuts and bolts, rivets, screws and clamps. For permanent construction of the beam configuration of this invention rivets are preferred, since they can be rapidly assembled and provide the necessary strength. On the other hand, however, for temporary facilities, nuts and bolts or screws are preferred, since they can be readily removed to allow for the disassembly of the beams.

The side walls of the beam structure enclose open-ended air chambers which reduce the weight of the beam structure, and also provide insulation against the passage of both heat and sound. The insulating effect can be increased, if desired, by closing off the open ends, and by filling the chambers with additional insulating material before assembly of the beams.

Due to its versatility and strength, the composite beam structure of this invention can be utilized for outer walls, roofing sections, inner partitions, and many other structural elements. In addition, the beam structure of this invention is also particularly useful for the construction of temporary buildings or other temporary facilities. Since the interlocking beam structure can be secured by detachable securing means, it can be disassembled without destroying the beams by simply removing the securing means, i.e., rivets or bolts, and then can be reused at a subsequent facility. Both the male end and female groove connecting means and the lightweight hollow construction make disassembly and reassembly elsewhere both feasible and practical.

The strong lightweight construction of the composite beam structure of this invention allows assembled partitions or walls to be readily moved without disassembly. If such walls or partitions are provided with wheels, their movement to alter the size of a room or change the layout of a building can be readily accomplished.

Having regard to the foregoing disclosure, the following is claimed as the inventive and patentable embodiments thereof:

1. A modular box beam structure comprising a plurality of modular integral beam units selected from I- and C-beam units joined together side-to-side in a push-in interlocking relation, the beam units having a web and two flanges in the C-units and a web and four flanges in the I-units, the flanges of adjacent beam units being interlocked in pairs, of which pairs one flange on one unit terminates in an open female channel extending from the flange along the beam with the opening leading into the channel facing away from the flange and towards the adjacent beam, and substantially in parallel to the flange, and the other flange on the other unit terminates in a male member extending from the flange along the beam facing away from the flange and towards the adjacent beam, and substantially in parallel to the flange, in alignment with the female channel, the male member being inserted in the female channel in a snug and rigid push-in joint, and fastening means extending through the male-in-female channel joint, interlocking adjacent I- and C-beam units together, and preventing withdrawal of the male members from the channels.

2. A modular box beam structure in accordance with claim 1, comprising one I-beam unit and two C-beam units.

3. A modular box beam structure in accordance with claim 1, comprising at least two I-beam units and two C-beam units.

4. A modular box beam structure in accordance with claim 1, comprising at least two I-beam units and no C-beam units.

5. A modular box beam structure in accordance with claim 1, in which the outer channel walls of the female channel members are flush with the outer side walls of the flanges.

6. A modular box beam structure in accordance with claim 1, comprising modular integral C-beam units attached to and closing off the open ends of terminal I-beam units, the C-beam units having a web and two flanges, of which one terminates in an open female channel extending along the flange and the other terminates in a male member extending along the flange, interlocking with the male member and female channel, respectively, of the terminal I-beam, and fastening means extending through both joints and attaching them together.

7. A modular box beam structure in accordance with claim 1, comprising I- and C-beam units, each having at least one male member and one female channel.

8. A modular box beam structure in accordance with claim 5, in which the I-beam units each have two male members and two female channels, one each on each side of the I-beam unit.

9. A modular box beam structure in accordance with claim 1, in which the male members extend over the entire length of the beams; the corresponding female channels extend over the entire length of the beams; and the male members engage the base portions of the channels over the entire length of the beams.

10. A modular box beam structure in accordance with claim 9, in which the male members and the female channels are inward of the flanges, and the outermost edges of one of the channel walls have tabs extending outwardly of the flanges substantially at right angles thereto, and said tabs abut the base portion of the flanges adjacent the mating male members and control the extent of the interlocking of the male members and female channels, and increase the bearing surface between adjacent I-beam units.

11. A modular box beam structure in accordance with claim 10, in which the tabs and female channels define channels running externally of the beam units along the entire length of the beams, and inserts in the channels, to attach additional structural members and accessory equipment to the exterior side of the beam.

12. A modular box beam structure in accordance with claim 1, in which the I-beam section male members have a first portion turned inwardly from the flange towards the interior of the beam substantially at right angles to the flange, and a terminal portion extending substantially parallel to the flange and substantially at right angles to the inwardly-turned first portion; and the female channels have a first portion turning inwardly towards the interior of the beam substantially at right angles to the flange, an outer channel wall extending substantially parallel to the flange and substantially at right angles to the inwardly-turned first portion, and an inner channel wall extending substantially parallel to the flange substantially at right angles to the inwardly-turned first portion, and substantially parallel to the outer channel wall, defining therebetween a channel whose opening is substantially in parallel to the flange and in alignment, side-to-side, with the male member of an adjacent beam.

13. A modular box beam structure in accordance with claim 12, in which the openings in the channels are smaller than the thickness of the corresponding male members so that the channels firmly engage the male members in a tight and rigid fit.

14. A modular box beam structure in accordance with claim 12, in which the terminal ends of the outer channel walls of the female channels have tabs extending outwardly thereof substantially at right angles thereto, and said tabs abut the base portion of the mating male members and control the extent of interlocking and increase the bearing surface between adjacent beams, and define external channels running along the beams for reception of inserts.

15. A modular box beam structure in accordance with claim 14, in which the external channels have openings flush with the sides of the flanges and have grooves formed at their inside corners running along the entire length of the beams; and inserts having lips which correspond to the grooves on the inside corners of the channels installed and held securely in the channels, to attach additional structural members and accessory equipment to either side of the composite beam structure.

16. A modular box I-beam or C-beam unit for tight and rigid side-to-side interlocking connection to adjacent like modular beam units to form a modular unit building beam structure, comprising a web having at least two flanges, the flanges being selected from flanges terminating in a male member extending outwardly from and substantially in parallel to the flange, and flanges terminating in a female channel extending outwardly from and along the flanges with the opening leading into the channel facing outwardly from the channel substantially in parallel to the flanges and in interlocking alignment with the male member of an adjacent beam unit, the male member and female channel being adapted to engage corresponding female and male members, respectively, of an adjacent beam unit snugly and rigidly in a side-to-side male-in-female-channel push-in-joint over a length sufficient to receive fastening means extending through both and attaching them together.

17. A modular box beam unit in accordance with claim 16, in which the openings in the channels are smaller than the thickness of the male member, so that the channel socket will firmly engage the male member of an adjacent beam unit.

18. A modular box beam unit in accordance with claim 16, in which the male member and the female channel each extend over the entire length of the beam, and the male member will engage the base portion of the channel of an adjacent beam unit, and the outer wall of the female channel is flush with the outer side wall of the flange of the adjacent beam unit upon assembly thereto.

19. A modular box beam unit in accordance with claim 16, in the form of a C-beam having one male member and one female channel.

20. A modular box beam unit in accordance with claim 19, in the form of an I-beam having two male members and two female channels.

21. A modular box beam unit in accordance with claim 16, in which the terminal end of the outer channel wall of the female channel has a tab extending outwardly substantially at right angles thereto; and said tab abuts the base portion of the flange adjacent the mating male member to control the extent of interlocking of the male members and female channel and increase the bearing surface within adjacent beam units.

22. A modular box beam unit in accordance with claim 21, in which the tab and outer wall of the female channel form a channel running externally to the beam unit and along the entire length of the beam to secure inserts having corresponding lips which can be installed therein and held securely, to attach additional structural members and accessory equipment to the beam.

23. A modular box beam unit according to claim 16, in which the male member has a first portion turned inwardly from the flange towards the interior of the beam unit substantially at right angles to the flange and a terminal portion extending substantially parallel to the flange and substantially at right angles to the inwardly-turned first portion; and the female channel has a first portion turned inwardly towards the interior of the beam unit substantially at right angles to the flange, an outer channel wall extending substantially parallel to the flange and substantially at right angles to the inwardly-turned first portion, and an inner channel wall extending substantially parallel to the flange substantially at right angles to the inwardly-turned first portion, and substantially parallel to the outer channel wall, defining therebetween a channel whose opening is substantially in parallel to the flange and in alignment, side-to-side, with the male member of an adjacent beam unit.

24. A modular box beam unit in accordance with claim 23, in which the opening in the channel is smaller than the thickness of the male member, so that the channel will firmly engage the male member of an adjacent beam unit in a tight and rigid fit upon insertion therein.

25. A modular box beam unit in accordance with claim 23, in which the terminal end of the outer channel wall of the female channel has a tab extending outwardly thereof substantially at right angles thereto, and said tab abuts the base portion of the mating male member to control the extent of interlocking and increase the bearing surface between adjacent beams, and define an external channel running along the beam unit for reception of inserts.

26. A modular box beam unit in accordance with claim 25, in which the external channel has an opening flush with the side of the flange and has grooves formed on its inside corners running along the entire length of the beam, to secure inserts having corresponding lips which can be installed therein and held securely, to attach additional structural members and accessory equipment to the beam.

* * * * *